United States Patent
Engel et al.

(10) Patent No.: US 9,990,724 B2
(45) Date of Patent: Jun. 5, 2018

(54) IMAGE RECORDING SIMULATION IN A COORDINATE MEASURING MACHINE

(71) Applicant: CARL ZEISS INDUSTRIELLE MESSTECHNIK GMBH, Oberkochen (DE)

(72) Inventors: Thomas Engel, Aalen (DE); Nils Haverkamp, Aalen (DE); Michael Wick, Munich (DE); Hans-Joachim Frasch, Aalen (DE)

(73) Assignee: CARL ZEISS INDUSTRIELLE MESSTECHNIK GMBH, Oberkochen (DE)

(*) Notice: Subject to any disclaimer, the term of this patent is extended or adjusted under 35 U.S.C. 154(b) by 0 days. days.

(21) Appl. No.: 15/196,614

(22) Filed: Jun. 29, 2016

(65) Prior Publication Data
US 2016/0307322 A1    Oct. 20, 2016

Related U.S. Application Data

(63) Continuation of application No. PCT/EP2014/051050, filed on Jan. 20, 2014.

(51) Int. Cl.
*H04N 5/228* (2006.01)
*G06T 7/00* (2017.01)
(Continued)

(52) U.S. Cl.
CPC .......... *G06T 7/0026* (2013.01); *G01B 11/005* (2013.01); *G01B 11/24* (2013.01);
(Continued)

(58) Field of Classification Search
CPC ....... G06T 7/0026; G06T 7/32; G06T 7/0002; G06T 15/00; G06T 2207/30168;
(Continued)

(56) References Cited

U.S. PATENT DOCUMENTS

| | | | |
|---|---|---|---|
| 7,092,860 B1 * | 8/2006 | Wasserman | G06T 15/00 356/396 |
| 8,606,549 B2 | 12/2013 | Chang et al. | |
| 2007/0069106 A1 * | 3/2007 | Krief | G02B 21/244 250/201.3 |

FOREIGN PATENT DOCUMENTS

| | | |
|---|---|---|
| DE | 10 2008 060 115 A1 | 6/2010 |
| DE | 10 2009 025 334 A1 | 12/2010 |

(Continued)

OTHER PUBLICATIONS

English language translation of International Preliminary Report on Patentability (Chapter 1) for PCT/EP2014/051050; dated Jul. 26, 2016; 7 pp.

(Continued)

*Primary Examiner* — Yogesh Aggarwal
(74) *Attorney, Agent, or Firm* — Harness, Dickey & Pierce, P.L.C.

(57) ABSTRACT

The present invention relates to a method for simulating an image recording by an optical sensor of a coordinate measuring machine for inspecting a measurement object, comprising the following steps: providing a first data set representing a model of the measurement object, a second data set representing a model of an illumination of the measurement object, and a third data set representing a model of an optics of the optical sensor, and rendering an image stack on the basis of the first data set, the second data set and the third data set, wherein the image stack has a plurality of virtual images of at least one partial region of the measurement object, wherein each virtual image is rendered at least with a different second and/or different third data set. Furthermore, the present invention relates to a method for optimizing an image recording by a coordinate measuring machine.

16 Claims, 7 Drawing Sheets

(51) Int. Cl.
- *G01B 11/25* (2006.01)
- *G01B 11/00* (2006.01)
- *G01B 11/24* (2006.01)
- *G06T 15/00* (2011.01)
- *H04N 5/232* (2006.01)
- *H04N 5/235* (2006.01)
- *G06T 7/32* (2017.01)

(52) U.S. Cl.
CPC ............ *G01B 11/25* (2013.01); *G06T 7/0002* (2013.01); *G06T 7/32* (2017.01); *G06T 15/00* (2013.01); *H04N 5/2351* (2013.01); *H04N 5/23212* (2013.01); *G06T 2207/30168* (2013.01)

(58) Field of Classification Search
CPC ............ H04N 5/23212; H04N 5/2351; G01B 11/005; G01B 11/24; G01B 11/25
USPC ...................................................... 348/222.1
See application file for complete search history.

(56) References Cited

FOREIGN PATENT DOCUMENTS

| | | |
|---|---|---|
| DE | 10 2011 104 357 A1 | 12/2012 |
| EP | 1 026 637 A2 | 8/2000 |
| EP | 2 281 666 A1 | 2/2011 |
| WO | 02/44650 A2 | 6/2002 |

OTHER PUBLICATIONS

Matt Pharr et al.; excerpt from Physically Based Rendering—from Theory to Implementation; 2nd edition, 2010; 14 pp.
Craig Kolb et al.; A Realistic Camera Model for Computer Graphics, 1995; 8 pp.
J. R. Fienup; Phase-retrieval algorithms for a complicated optical system; 1993; 10 pp.
International Search Report with Written Opinion for PCT/EP2014/051050; dated May 2, 2014; 10 pp.

* cited by examiner

IMAGE RECORDING SIMULATION IN A COORDINATE MEASURING MACHINE

CROSS-REFERENCE TO RELATED APPLICATIONS

This is a Continuation application of International patent application PCT/EP2014/051050, filed Jan. 20, 2014, the contents of which are incorporated herein by reference.

BACKGROUND OF THE INVENTION

The present invention relates to a method for simulating an imaging onto an optical sensor of a coordinate measuring machine for inspecting a measurement object. Furthermore, the present invention relates to a method for optimizing an illumination of a measurement object in a coordinate measuring machine with an optical sensor.

Coordinate measuring machines as such are generally known. They are used in industrial applications for example for quality assurance or measuring components in retro-fit processes or other applications. By means of the coordinate measuring machines, geometries and dimensions of components for the purpose thereof are measured with high accuracy. Various measuring methods differentiated, in principle, into so-called tactile measuring methods and optical measuring methods may be used for determining the coordinates of the components.

Tactile measuring methods probe the component by means of a probe element during the measuring process. By way of example, the probe element is a probe sphere attached to one end of a probe pin. The probe pin with the probe sphere may usually be arranged and aligned in an arbitrary orientation within a measurement area by means of a structural design. By way of example, gantry designs, horizontal arm designs or table designs are known for this purpose.

Optical measuring methods operate without contact, that is to say that the component to be measured, the measurement object, is recorded by means of an optical sensor, for example a camera, and the image data thus obtained are evaluated. A multiplicity of optical measuring methods are known which differ not only in the manner of the image recording but also in the manner of the illumination arrangement. By way of example, deflectometry methods, interferometric methods or chromatic methods, such as the white light sensor method, for example, are known. The optical measuring methods are often accompanied by an electronic image processing and evaluation in order to extract the desired data from the image recordings. Optical sensors may also be arranged in a freely movable and orientable manner within a measurement area by means of a structural design such as a gantry design, horizontal arm design or table design.

All of the abovementioned types of coordinate measuring machines and measuring methods should be understood to be merely by way of example and serve for introduction to the technical field of the present invention. The present invention is concerned with coordinate measuring machines which use optical sensors.

In the case of such coordinate measuring machines with optical sensors, the illumination of a measurement object is of great importance for the accuracy and thus the quality of the measurement. It is generally endeavoured to achieve a homogeneous illumination of appropriate brightness over the entire region of the image recording, in order to be able to detect all details of the measurement object with the highest possible contrast. In this case, the brightness ranges which may be regarded as appropriate are dependent on the type of optical sensor and the brightness ranges proccessible therein.

However, the setting of the illumination in practice requires a high degree of experience on the part of the operating personnel of the coordinate measuring machine or else is very time-consuming, since possibly one or more measurement passes with poor illumination are initially carried out in order to iteratively approximate to the best illumination. Consequently, the operator thus has to carry out a plurality of attempts before arriving at an appropriate illumination which then yields only just usable measurement results. Generally, it is therefore endeavoured to minimize the required prior knowledge and expenditure of time for setting an optimum illumination.

The document DE 10 2009 025 334 A1 discloses a method for ascertaining an ideal appearance of painted surfaces of components such as bodywork components. It is proposed that components to be provided with a multilayered paint are photographed and their optical impression after hypothetical painting is calculated and represented by means of a rendering program. An evaluation is then intended to be made to the effect of whether this calculated optical impression is classified as attractive or not attractive. On the basis of this evaluation, parameters of the paint coating to be applied are then intended to be modified and evaluated by means of recalculations possibly to be performed until the optical impression is classified as "attractive".

It is an object of the present invention to specify a possibility for simplifying the setting of an illumination in a coordinate measuring machine with an optical sensor.

BRIEF SUMMARY OF THE INVENTION

In accordance with a first aspect of the invention, therefore, a method for simulating an image recording by an optical sensor of a coordinate measuring machine for inspecting a measurement object, comprising the following steps, is provided:

providing a first data set representing a model of the measurement object, a second data set representing a model of an illumination of the measurement object, and a third data set representing a model of an optics of the optical sensor, and rendering an image stack on the basis of the first data set, the second data set and the third data set, wherein the image stack has a plurality of virtual images of at least a partial region of the measurement object, wherein each virtual image is rendered at least with a different second and/or different third data set.

This makes it possible to perform a complete simulation of the image recording of an object or object region using the methods of rendering on the basis of the object properties known in measurement technology from CAD data. This measurement may be supported by one or more real measurements, as will be explained below.

The methods of rendering per se are known. The term "rendering" is familiar and a corresponding implementation by means of products that are freely available commercially is possible. For the theoretical principles, reference may be made for example to the book "Physically Based Rendering—from Theory to Implementation" by Matt Pharr and Greg Humphreys, 2nd edition, Morgan Kaufmann Publishers, 2010.

Regarding the implementation of lenses or optics of optical sensors that is mentioned in the present application, reference may furthermore be made to the technical article by Kolb, Mitchell and Hanrahan "A Realistic Camera Model for Computer Graphics", Computer Graphics ("Proceedings of SIGGRAPH" 95), ACM SIGGRAPH, 1995, pages 317 to 324.

Furthermore, with regard to wavefront treatment or so-called "phase-retrieval", reference may be made to the technical article "Phase-Retrieval Algorithms for a Complicated Optical System" by J. R. Fienup, Applied Optics, Volume 32, No. 10, 1993, pages 1737 to 1746.

A first step thus involves providing a first data set representing a model of the measurement object, a second data set representing a model of an illumination of the measurement object, and a third data set representing a model of an optics of the optical sensor. These three data sets contain the essential parameters for simulating the imaging onto the optical sensor of the coordinate measuring machine which are required for the rendering. The first data set may be provided for example in the form of a CAD (Computer Aided Design) data set of the measurement object. The third data set representing the model of an optics or of a lens of the optical sensor may be provided for example in the form of indications about the position and constitution of the used lens elements and/or mirror elements of the lens, the position and situation of the optical sensor and further variables that influence the optical imaging path. By way of example, a customary tabular indication of radii of curvature, distances between the individual surfaces and used materials with refractive index and Abbe number is possible, as is proposed in the article by Kolb et al. The second data set describing the illumination of the coordinate measuring machine may be provided for example by location and constitution of the light sources, their emission angles, light intensity profiles, etc. In the step of rendering, it thus becomes possible to calculate a virtual image of the measurement object, said virtual image being imaged onto the optical sensor of the coordinate measuring machine, with predefined illumination.

Furthermore, a fourth data set may additionally be provided, which represents a model of a conversion of the photon flux or light incident on the optical sensor into electrical signals, wherein the electrical signals are in particular electrical signals that are graphically representable, processable in a computer-aided manner and storable. By means of a fourth data set, it is thus possible to take account of the processing of the measurement signal over and above the optical imaging. By way of example, it is possible in this way to take account of a pixilation of the optical sensor, a wave dependence of the sensitivity of the optical sensor and other variables that influence the transmission path between the optical imaging and the electrical signal.

The term "optical sensor" denotes a unit for the spatially resolved and/or directionally resolved detection of the photon flux emerging from the illuminated measurement object.

Furthermore, it becomes possible to calculate an image stack. Such an "image stack" is a set of a plurality of images of the same measurement object or of the same partial region of a measurement object which are calculated in the case of different parameter sets for at least one of the second data set, the third data set and the fourth data set. By way of example, as a parameter a position of a focal plane may be altered here by changing the focus setting of the lens and/or by changing the distance between lens and measurement object.

This makes it possible to calculate a plurality of respective image recordings with respectively different parameters of the image recording. If only a variation of spatial parameters is performed, this image stack may extend in an extended fashion for example along the optical axis of the lens, wherein the images are in each case perpendicular to the optical axis, provided that no image plane tilts are provided, for example for complying with the Scheimpflug condition. However, alternatively or cumulatively, a variation of parameters of the illumination, parameters of the positioning of the optical sensor relative to the measurement object, the size and position of the partial region of the measurement object, etc. may for example be effected as well.

This enables a user to "scroll" through the image stack and observe effects of the variations. By way of example, with a specific predefined virtual illumination it is then possible to scroll along the optical axis of the lens and to observe the detected partial region of the measurement object or the measurement object as a whole in different planes. Moreover, an, in particular automatic, assessment of the recordings with regard to usability for a measurement is made possible in this way. The user may thus not only select the desired parameter composition, for example the position of the focal plane in the real measurement, but possibly also modify, or cause to be automatically modified, the settings for the virtual illumination or the size of the detected partial region until the quality of the simulated virtual image appears to be sufficient. With regard to the quality of the image recording, it thus becomes possible, in particular, to identify different convergence ranges of an optimization of the quality of the image recording that are possibly present. The settings underlying the calculation may then be accepted in the real coordinate measuring machine and the real measurement may be carried out on this basis. This therefore makes it possible to avoid a time-consuming setting method dependent on the user's experience and ability on the real coordinate measuring machine.

In accordance with a second aspect of the invention, a method for optimizing an image recording of a measurement object in a coordinate measuring machine by an optical sensor, comprising the following steps, is provided:

providing a first data set representing a model of the measurement object, a second data set representing a model of an illumination of the measurement object, and a third data set representing a model of an optics of the optical sensor, simulating an image recording of at least one virtual image of the measurement object imaged onto the optical sensor by rendering on the basis of the first data set, the second data set and the third data set, and setting the image recording of the measurement object on the basis of the at least one simulated virtual image of the measurement object.

The method in accordance with the second aspect of the invention thus involves firstly providing a first, a second and a third data set, wherein the step of providing corresponds to that of the method in accordance with the first aspect. Here, too, the fourth data set described above may additionally be provided. A process of simulating an image recording by rendering is then likewise effected. In this case, at least one virtual image imaged on the optical sensor is calculated. The user may observe said at least one virtual image or subject it to an automated evaluation and an illumination of the measurement object may be set or varied on the basis thereof. In this way it becomes possible, without having to perform settings on the real coordinate measuring machine, to be able to perform a setting of an illumination on the coordinate measuring machine more time-efficiently and without required experience in handling coordinate measuring machines.

In accordance with a third aspect of the invention, a coordinate measuring machine for inspecting a measurement object comprising an optical sensor and comprising a data processing device for controlling the coordinate measuring machine is provided, wherein the data processing device is configured in such a way that it performs a method in accordance with the first aspect of the invention or one of its refinements or in accordance with the second aspect of the invention or one of its refinements.

A fourth aspect of the invention furthermore provides a computer program product comprising program code which carries out a method in accordance with the first aspect of the invention or one of its refinements or in accordance with the second aspect of the invention or one of its refinements when it is executed on a data processing device, in particular a data processing device of a coordinate measuring machine.

The coordinate measuring machine in accordance with the third aspect and the computer program product in accordance with the fourth aspect therefore have the same advantages as the method in accordance with the first aspect of the invention or the method in accordance with the second aspect of the invention.

In one refinement of the method in accordance with the first aspect, the following steps are furthermore carried out:
  determining a parameter representing a quality of the image recording in each virtual image of the image stack,
  ascertaining the virtual image for which the parameter representing the quality of the image recording takes an optimum, and
  defining the second and/or third data set underlying the image recording of said virtual image as the best image recording setting.

Consequently, firstly a parameter representing the quality of the image recording is thus determined in each virtual image of the image stack. Said parameter may be for example the focusing, the brightness and/or the contrast, but in principle an arbitrary parameter may be formed for this, in particular in the form of a "merit function" known in the area of the optimization. This may involve an output value of a customary method for assessing an image recording. In the case of a focusing as a parameter of the quality, it is possible for example to choose a line lying perpendicular to an edge to be observed, and to determine a brightness gradient along this line. The image which then includes the extremum of the brightness gradient along this line may then be assessed as the image having the best focus setting.

In this way, it is then possible to ascertain the virtual image having an optimum for the parameter representing the quality of the image recording. It is then possible to define the focus setting for this virtual image as the best image recording setting. In this way, an optimization of the image recording may be performed for example by means of the method for simulating an imaging purely in a computational manner.

In a further refinement of the method, the following step may then be performed:
  applying the best image recording setting at least to the optics and/or the illumination of the coordinate measuring machine.

In this way, the user may then apply the settings that are output to the real coordinate measuring machine and thus directly carry out the measurement with a best image recording setting.

In a further refinement of the method in accordance with the first aspect it may be provided that a real image of the measurement object is recorded by the optical sensor, and an image recording setting of the optics and/or of the illumination of the coordinate measuring machine is effected proceeding from an image recording setting of the real image with respect to the best image recording setting.

What may be implemented in this way is that the ultimate setting or the process of applying the ascertained setting for the best image recording plane is also performed in a directly automated manner on the coordinate measuring machine. By way of example, as explained below, the image recording setting underlying the real image may be ascertained by comparing the real image with the images of the rendered image stack and the setting for the best image recording plane may then be performed in an automated manner proceeding from this setting. It goes without saying that other possibilities are also conceivable. By way of example, it is also possible to arrange a reference object in the measurement region of the optical sensor, a statement about the position of the image recording plane being possible from the imaging of said reference object onto the optical sensor.

Furthermore, in one refinement of the method in accordance with the first aspect of the invention it may be provided that, before the step of rendering, at least one real image of the measurement object is recorded by the optical sensor and is used as a support point for the step of rendering.

In this way it is possible, in the step of rendering, to bring about an improved simulation of the imaging onto the optical sensor by virtue of the fact that, for example, actual values for a specific image may be predefined, on the basis of which the calculation may then be effected.

In accordance with a further refinement of the method according to the first aspect of the invention it may be provided that the image recording setting of each real image is previously known.

By way of example, it may be provided that this image recording setting is stored on the basis of the position of the lens of the optical sensor and/or the arrangement of the optical elements of the lens or the optics of the optical sensor. In this way, the image recording setting with regard to each real image of the coordinate measuring machine is known during the recording thereof and may be assigned to this image, such that it is previously known during the further use.

Furthermore, in accordance with a further refinement of the method in accordance with the first aspect of the invention it may be provided that, after the step of rendering, each real image is fitted into the image stack by correlation with the virtual images of the image stack and the image recording setting of the real image is ascertained therefrom.

In this way, even without previously known image setting by comparing the real recorded image with the virtual images of the image stack by means of a correlation, for example a pixel-to-pixel correlation, a best correspondence may be found and the associated image recording settings of the virtual image may be accepted as that of the real image.

In a further refinement of the method in accordance with the first aspect it may be provided that a real image of the measurement object is recorded by the optical sensor, that, after the step of rendering, the real image is fitted into the image stack by correlation with the virtual images of the image stack, and in that deviations between the real image and a corresponding virtual image of the image stack are ascertained. "Fitting" means classifying the real image on account of its image recording setting into the sequence of virtual images. For example a real image with focus $z_1+10$ mm would be sorted by insertion for instance between two virtual images with $z_2=+9$ mm and $z_3=11$ mm.

In this way it likewise becomes possible to improve the quality of the calculations during the step of rendering. As already described above, the real image may be fitted into the image stack on the basis of a correlation with the virtual images of the image stack. The virtual image to which there is the best correspondence in the context of the correlation is then compared with the actual image. Deviations between the real image and the virtual image may be ascertained in this way and used for example for improving the step of rendering if it is performed once again. Furthermore, it becomes possible also to apply the deviations to the virtual images for the purpose of improvement.

By way of example, in a further refinement it may be provided that a best virtual image with the best image recording setting is rendered taking account of the deviations.

It is not necessary for the recorded real image already to have a best image recording setting. The rendering of the image stack may indeed have the result that a different image having a different underlying image recording setting has the best image recording setting. It is thus possible firstly to ascertain the deviations between the real image and a corresponding correlated virtual image and then to apply them to the virtual image with the best image recording setting in order to provide an improved virtual image with a best image recording setting. This may then be used further, for example, in particular for optimizing the illumination setting.

In a further refinement of the method it may be provided that a virtual image in a measurement plane which is a plane with an arbitrary image recording setting within the image stack is rendered taking account of the deviations.

The image plane in which a measurement is intended to be carried out need not be the one in which the best image recording setting is present. Although this will generally be the case, this is not mandatory. In this respect, an arbitrary different measurement plane having a different image recording setting than the best image recording setting may also be calculated in an improved manner on the basis of the deviations ascertained.

In a further refinement of the method it may be provided that the third data set has previously detected aberrations of the optics of the optical sensor, which are stored in particular in the form of a Zernike polynomial, and the aberrations are subtracted during the rendering of the best virtual image or of the virtual image in a measurement plane.

It goes without saying that a Zernike polynomial for describing the aberration should be understood to be merely by way of example. Other polynomial approaches, series expansions or integral expansions for describing the wavefront aberrations of the lens of the optical sensor or of the optics are also possible, for example a Chebychev polynomial. The aberrations may be measured on the real optical sensor beforehand using a wavefront aberrometer, for example, and then be subtracted from the best virtual image or the virtual image in a measurement plane. It goes without saying that such subtraction of the aberrations may also be carried out for any other calculated virtual image.

For this purpose, for example, in the step of rendering, further refinement such as the phase-retrieval application mentioned above may be applied in order to be able to correspondingly subtract the aberrations stored in the form of, for example, a Zernike polynomial.

In a further refinement of the method it may be provided that the region of the measurement object in which the plurality of virtual images are rendered is larger than a region of the measurement object from which the real image is recorded.

In principle, for a successful correlation it is thus only necessary that the real image and the calculated virtual image have a sufficiently large overlap. Therefore, one real image may also suffice to support a plurality of rendered virtual image stacks in the calculation. Furthermore, it is also possible, for example, already assuming a translational displacement of the optical sensor parallel to the image recording plane, to calculate a plurality of virtual image stacks adjoining one another and then ultimately to join them together in the calculation to form a virtual image which is larger than a region of the measurement object from which a real image is recorded.

Joining together the virtual images or the virtual image stacks may be carried out by methods of fusing image data that are known per se, such as, for example, the so-called "stitching" method or other methods.

In a further refinement of the method in accordance with the second aspect of the invention, the following steps may be carried out:
  ascertaining the quality of the image recording of the measurement object by determining a value of a parameter representing the quality from at least one of the at least one rendered virtual image,
  comparing the value of the parameter with a limit value, and
  either, if the comparison is negative, varying at least the second data set and/or the third data set, and repeating the steps of simulating, ascertaining and comparing,
  or, if the comparison is positive, using the second data set for setting the image recording by the coordinate measuring machine.

In this way it becomes possible to determine the quality of the image recording of the measurement object in an automated manner. The parameter representing the quality of the image recording of the measurement object may be chosen suitably as already described. By way of example, an averaged image brightness may also be used and/or a particularly small difference between brightness ranges within an image may be demanded.

The method may then operate iteratively in an automated manner. The variation of the second data set may be effected for example in the form of a variation of a location and the position and/or the number of the light sources, their light intensity, their emission angles, etc.

In a further refinement of the method, the following steps may be provided:
  ascertaining the quality of the image recording of the measurement object by determining a value of a parameter representing the quality from at least one of the at least one rendered virtual image,
  varying at least the second data set and/or the third data set within a predetermined optimization range and repeating the steps of simulating and ascertaining,
  using that second data set for setting the image recording by the coordinate measuring machine for which the parameter representing the quality takes an optimum.

In this way, in contrast to the previous refinement, which terminates the variation of the second data set when a limit value criterion is satisfied, a specific optimization range is then run through and simulated completely parametrically. For all rendered images, the parameter representing the quality of the image recording is determined and then that image recording setting which led to the best quality is selected. Whether the "optimum" is a maximum or a minimum depends on the type of parameter representing the quality. If a difference between brightnesses within an image is used, for example, it will be a minimum.

In a further refinement it may be provided that the step of simulating the image recording of the at least one virtual image of the measurement object imaged onto the optical sensor is a method according to the first aspect of the invention or one of its refinements. The first and second aspects can also be advantageously combined in this way.

It goes without saying that the features mentioned above and those yet to be explained below can be used not only in the combination respectively indicated, but also in other combinations or by themselves, without departing from the scope of the present invention.

BRIEF DESCRIPTION OF THE SEVERAL VIEWS OF THE DRAWING

Embodiments of the invention are illustrated in the drawing and are explained in greater detail in the following description. In the figures.

DETAILED DESCRIPTION OF THE INVENTION

Figure 1:
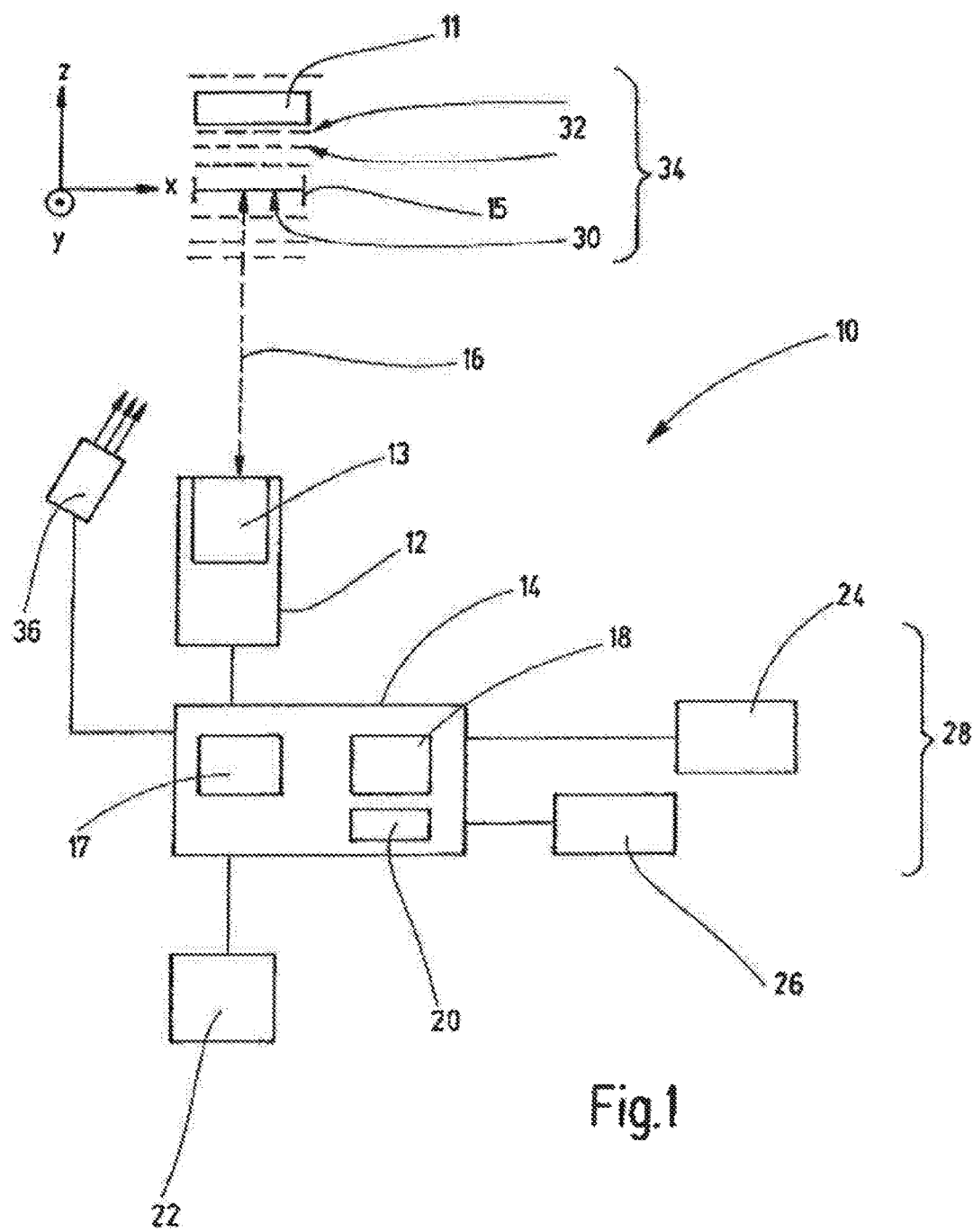
FIG. 1 shows a schematic block diagram of a coordinate measuring machine and a computer program product.

FIG. 1 shows a coordinate measuring machine 10. The coordinate measuring machine 10 serves to perform image recordings of a measurement object 11. For this purpose, the coordinate measuring machine 10 has an optical sensor 12. The optical sensor 12 is a camera, for example, that is to say an optical sensor 12 which captures a planar, that is to say two-dimensional, recording of the measurement object 11.

The coordinate measuring machine 10 furthermore has an optical imaging system or an optics 13, which is part of the optical sensor 12 and serves to image the light incident on the optical sensor 12 from the measurement object 11 onto the optical sensor 12 in a suitable manner.

The coordinate measuring machine 10 furthermore has a data processing device 14, which serves to evaluate the image captured by the optical sensor 12.

The optical sensor 12 has a capture region 15 extending in the X-Y plane in the view illustrated schematically in FIG. 1. An image captured by the optical sensor 12 thus lies parallel to the X-Y plane in the capture region 15. The image plane or focal plane captured sharply by the optical sensor 12 is spaced apart from the optical sensor 12 by an optical working distance 16. The position in the Z direction may thus be influenced relative to the measurement object 11 by altering the setting of the optical imaging system, such that the optical working distance 16 is altered. It is also possible, however, while maintaining the optical working distance 16, to effect a mechanical movement of the optical sensor 12 and of the measurement object 11 relative to one another in order to influence the position of the recorded image relative to the measurement object 11. In this case, the measurement object 11 and/or the optical sensor 12 may be moved. For illuminating the measurement object 11, the coordinate measuring machine 10 has an illumination device 36.

The data processing device 14 has a central data processing unit 17 that can carry out computation operations. Furthermore, the data processing device 14 has a storage unit 18, in which image data sets can be stored. A computer program product 20 may be installed which performs the method described in detail below on the data processing device 14.

Furthermore, the coordinate measuring machine 10 has an input device 22, by means of which user inputs into the data processing device 14 of the coordinate measuring machine 10 can be performed. Measured value results may be output to a user by means of a display device, for example a screen, 24 and/or by means of a printer device 26. The display device 24 and/or the printer device 26 form an output device 28.

Figure 2:
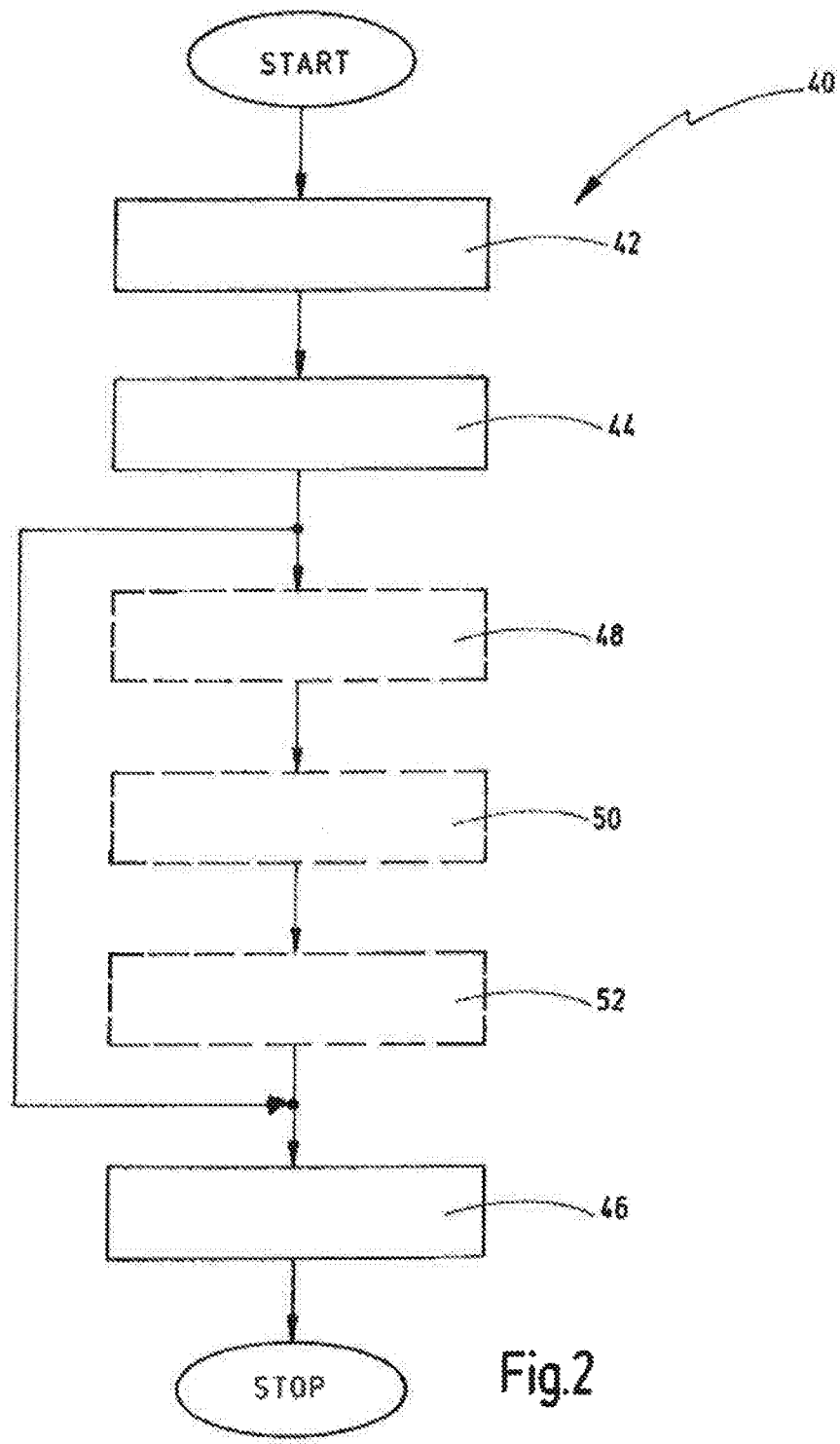
FIG. 2 shows a schematic block diagram of one embodiment of a method for optimizing an image recording setting of a coordinate measuring machine.

FIG. 2 shows a first embodiment of a method for optimizing an illumination of a measurement object in a coordinate measuring machine. The method is identified generally by the reference sign 40.

After the start, there is carried out firstly a step 42 of providing a first data set representing a model of the measurement object 11, a second data set representing a model of an illumination 36 of the measurement object 11, and a third data set representing a model of an optics 13 of the optical sensor 12.

Afterward, there is carried out a step of simulating 44 at least one virtual image of the measurement object 11 imaged onto the optical sensor 12 by rendering on the basis of the first data set, the second data set and the third data set. Afterward, in one configuration, the step of setting 46 the illumination of the measurement object 11 on the basis of the at least one simulated virtual image of the measurement object 11 may then be carried out directly.

In this way, the setting method with real evaluation that is otherwise carried out on the real measurement object 11 by means of the real illumination device 36 and the real coordinate measuring machine 10 is replaced by a complete virtual treatment by means of a CAD model of the measurement object, a model of the coordinate measuring machine with its illumination and a rendering of the resultant imaging onto the optical sensor.

Instead of proceeding directly to step 46 after step 44, between these steps there may also firstly be carried out a step 48 of ascertaining the quality of the illumination of the measurement object by determining a value of a parameter representing the quality from at least one of the at least one rendered virtual image. Afterward, a step 50 of varying the second data set within a predetermined optimization range and repeating the steps of simulating and ascertaining may then be carried out. Varying the second data set within a predetermined optimization range may be effected for example in such a way as to run through the position and alignment of the illumination device 36 within specific position ranges and alignment angle ranges. It goes without saying that provision may be made for more than one illumination device 36 to be provided. Further variable parameters arise in this case.

Afterward, there may then be carried out a step 52 of using that second data set for setting the illumination by the coordinate measuring machine for which the parameter representing the quality takes an optimum.

Afterward, step 46 may then still be performed and the illumination of the measurement object 11 may be set by means of the second data set for which the parameter representing the quality takes an optimum.

Figure 3:
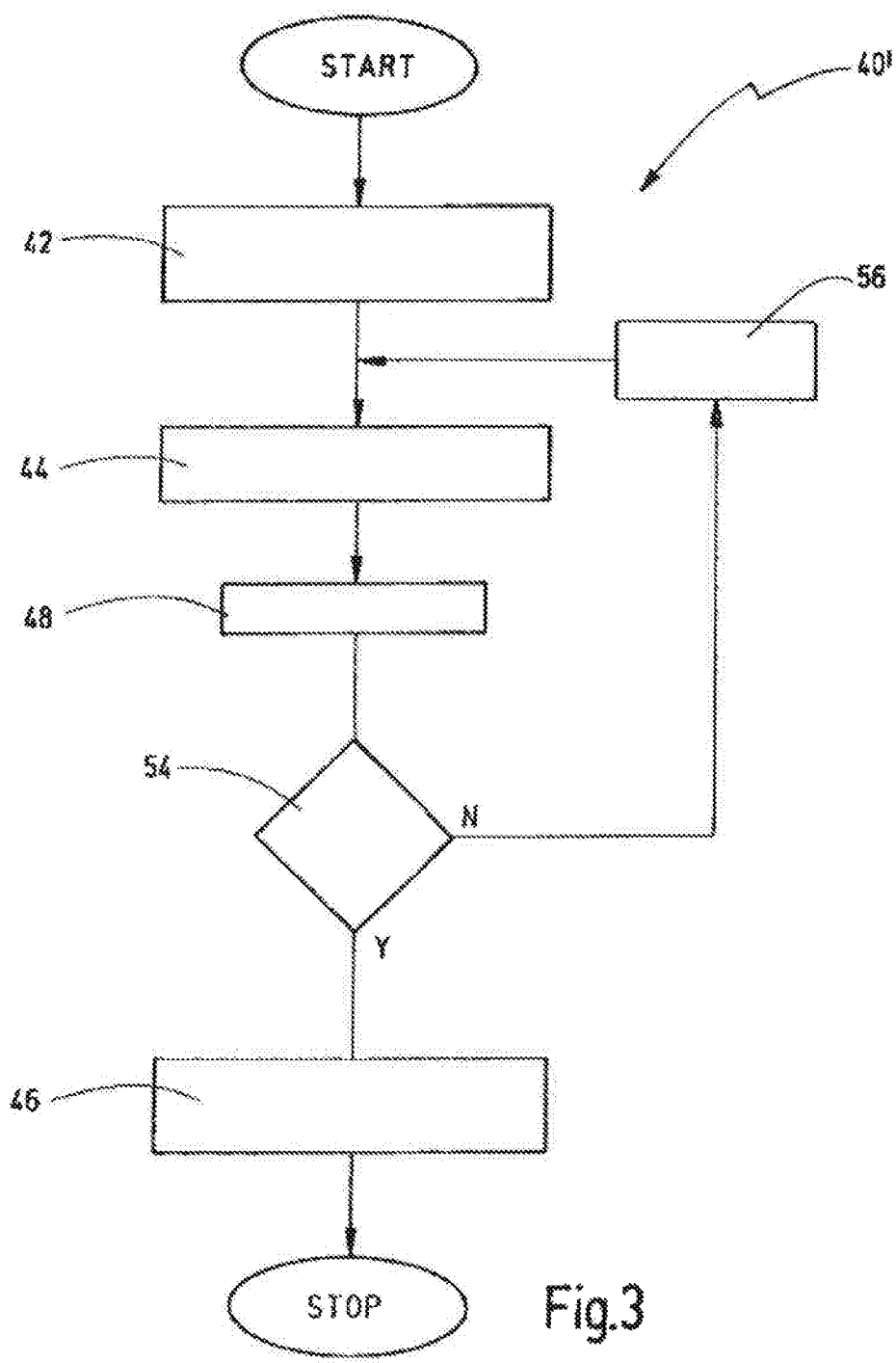
FIG. 3 shows a further embodiment of a method for optimizing an image recording setting of a coordinate measuring machine.

FIG. 3 shows one possible second embodiment of the method 40.

Firstly, identical steps 42 and 44 are carried out. Afterward, a step 48 involves ascertaining the quality of the illumination of a measurement object by determining a value of a parameter representing the quality from at least one of the at least one rendered virtual image.

A comparison of said parameter with a limit value follows in a step 54. If the interrogation is negative, the second data set, i.e. the illumination setting, is varied and the step of simulating 44 and ascertaining 48 is repeated. If the interrogation is positive, afterward step 46 is performed with the settings and the ascertained setting of the illumination of the measurement object on the real coordinate measuring machine 10 is carried out.

Figure 4:
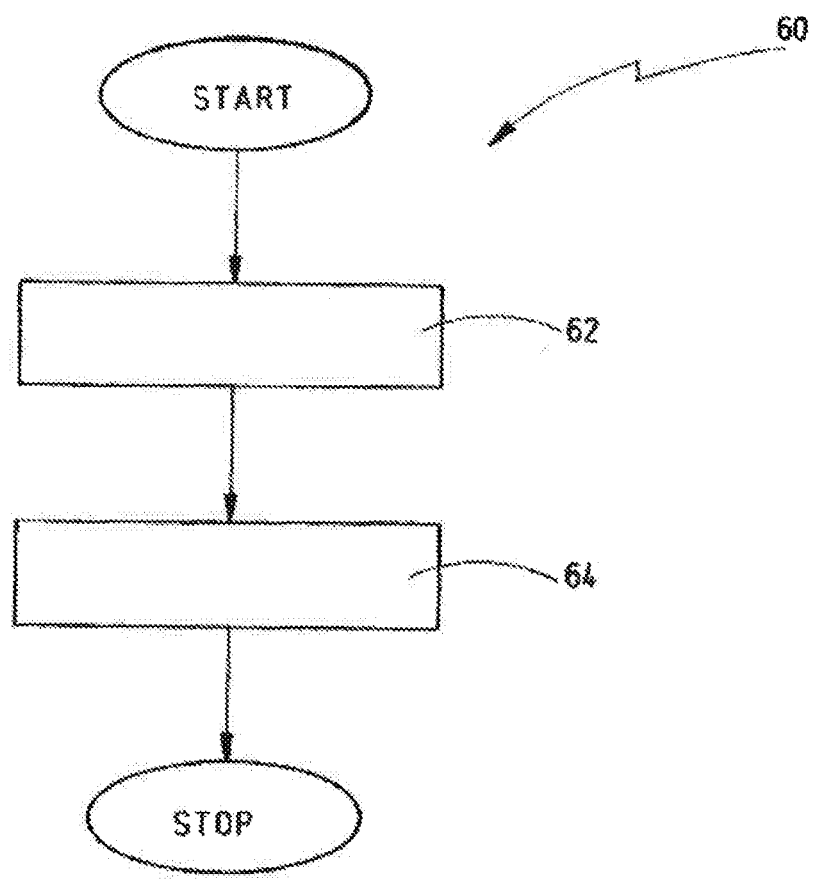
FIG. 4 shows a first embodiment of a method for simulating an image recording of a measurement object by an optical sensor of a coordinate measuring machine.

FIG. 4 shows one embodiment of a method 60 for simulating an imaging on an optical sensor of a coordinate measuring machine 10 for inspecting a measurement object 11.

Firstly there is carried out a step 62 of providing a first data set representing a model of the measurement object 11, a second data set representing a model of an illumination 36 of the measurement object 11, and a third data set representing a model of an optics 13 of the optical sensor 12.

Afterward, there is carried out a step of rendering 64 an image stack 34 on the basis of the first data set, the second data set and the third data set, wherein the image stack has a plurality of virtual images of at least one partial region of the measurement object 11, wherein each virtual image is rendered at least with a different second and/or different third data set.

In this way, from a known predefined optics 13, known predefined illumination and the CAD model of the measurement object 11, an entire image stack is simulated for further use. For the step of rendering 64 it is possible to use for example a commercially available 3D engine, for example an MC Ray tracing-based 3D engine. A Monte Carlo simulation may be performed in particular for the simulation of the optical system.

If appropriate, for the rendering in one configuration a real image may be generated and fitted into the image stack 34 by means of correlation in order in this way to support the calculation, as will be explained below.

Figure 5:
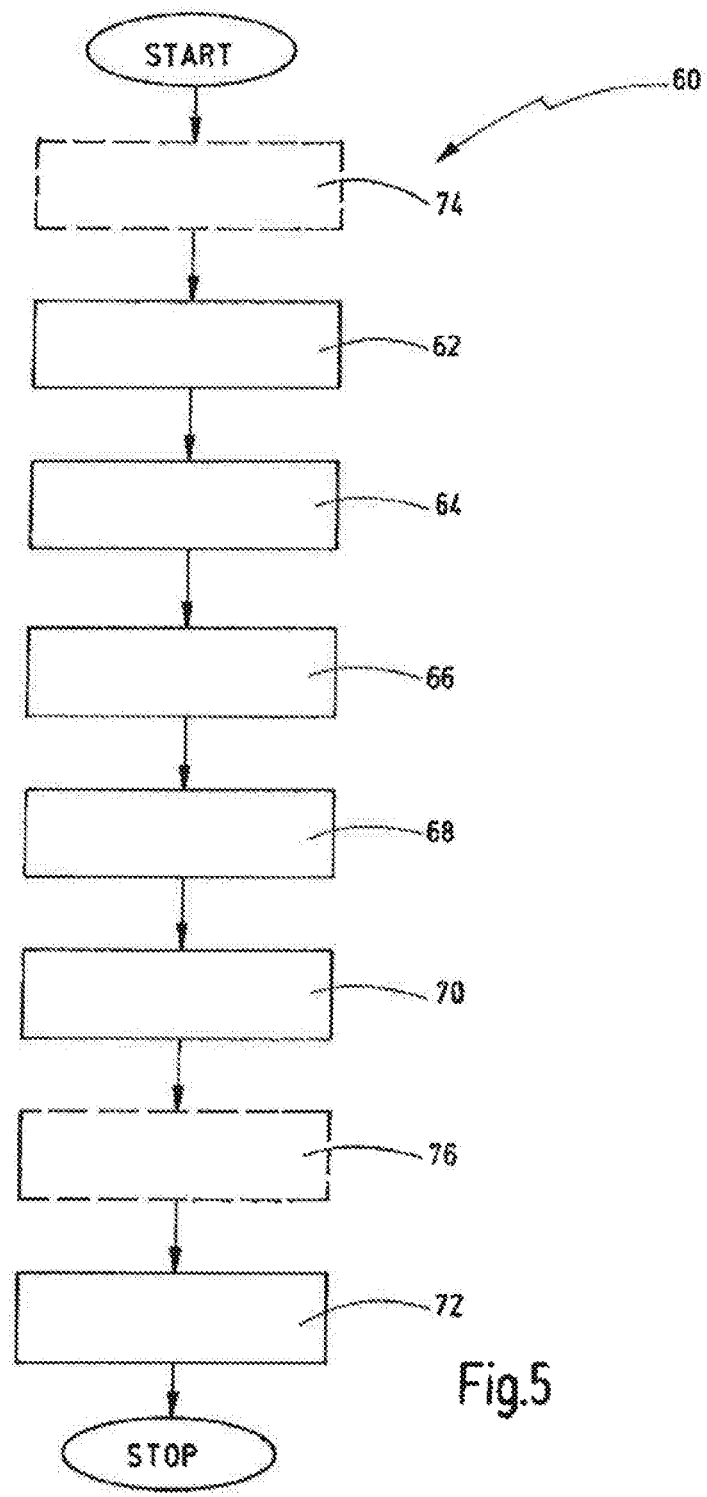
FIG. 5 shows a second embodiment of a method for simulating an image recording of a measurement object by an optical sensor of a coordinate measuring machine.

FIG. 5 shows a further configuration of the method 60. Here, for example, firstly steps 62 and 64 as described above may be performed.

Then a step 66 involves determining a parameter representing a quality of the image recording in each virtual image of the image stack 34. Afterward, a step 68 involves ascertaining the virtual image for which the parameter representing the quality of the image recording takes an optimum, and afterward a step 70 involves defining the image recording setting of this virtual image as the best image recording setting. By way of example, the image recording setting may involve the focussing, the contrast, the brightness, a homogeneity of the brightness distribution or some other parameter.

On the basis thereof, in a step 72 the best image recording setting may then be applied to the optics 13 of the coordinate measuring machine 10. In configurations, in a step 74, at the beginning at least one real image of the measurement object 11 may be recorded and used as a support point for the step of rendering. Furthermore, in one configuration it is possible, after the step of rendering 64, to fit each real image into the image stack by correlation with the virtual images of the image stack and to ascertain the image recording setting of the real image therefrom. It may then be used, if appropriate, in a further pass of the step of rendering 64, which is then followed again by steps 66, 68, 70 and 72. Step 76 is only necessary, however, if the image recording settings for each real image are not already previously known beforehand during step 74.

Figure 6:
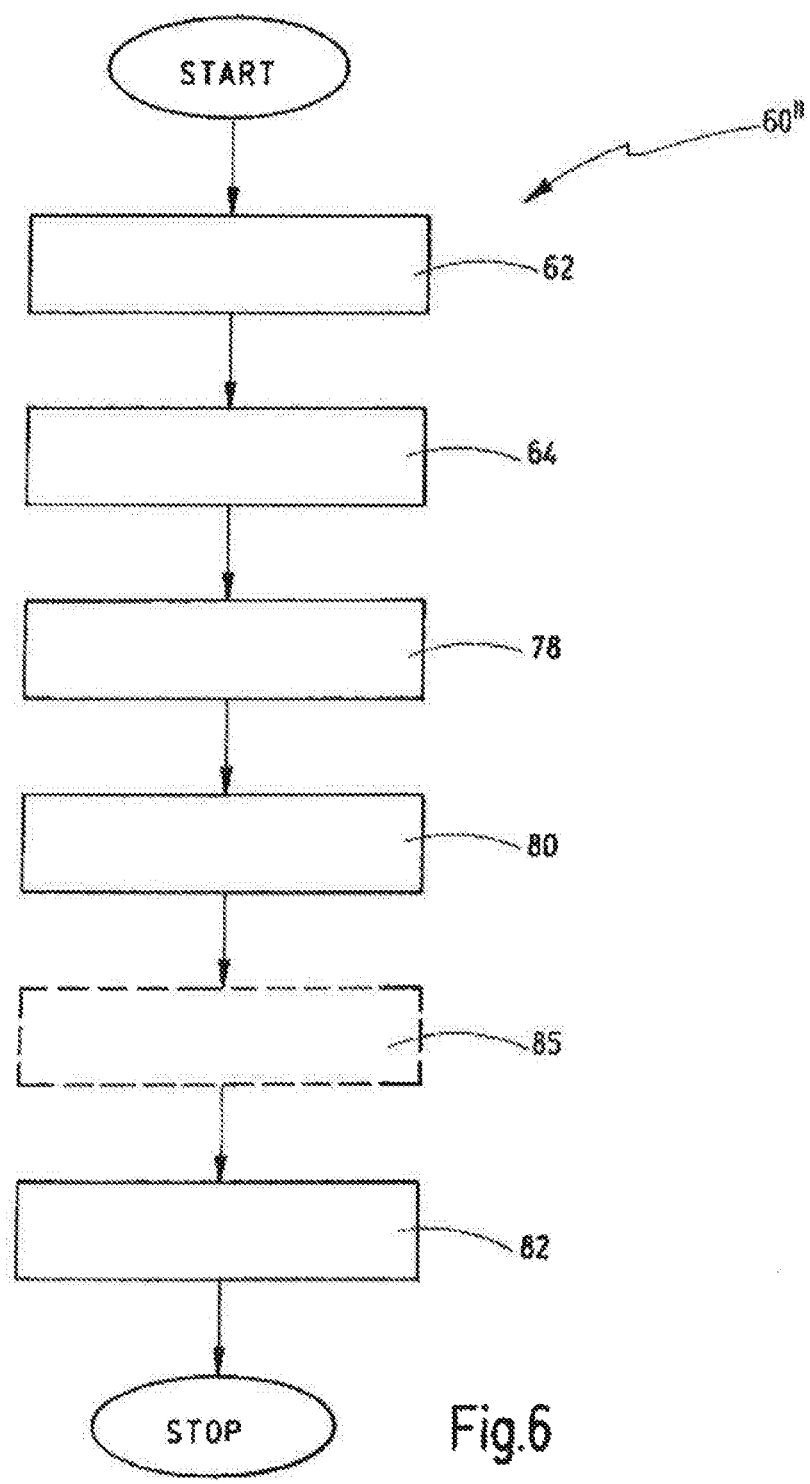
FIG. 6 shows a third embodiment of a method for simulating an image recording of a measurement object by an optical sensor of a coordinate measuring machine.

FIG. 6 shows a further embodiment of the method 60. Firstly, steps 62 and 64 are carried out as described above. Afterward, a step 78 is performed, which involves using the optical sensor 22 to record a real image of the measurement object, which, after the step of rendering, is fitted into the image stack by correlation with the virtual images of the image stack. Deviations between the real image and the corresponding virtual image of the image stack are then ascertained in a subsequent step 80. This then makes it possible, in a step 82, to render a best virtual image taking account of the previously determined deviations. Alternatively, it is also possible, in step 82, to render a different virtual image of an arbitrary measurement plane with an arbitrary image recording setting within the image stack.

As a configuration it is furthermore possible, in a step 85, to calculate further planes within the image stack in addition to the best image recording plane.

Such a method presupposes only knowledge about the desired arrangement of an alignment of the illumination, the positioning and alignment of the coordinate measuring machine 10 in three translational and, if appropriate, rotational dimensions and knowledge about the optics 13 of the optical sensor 22. In particular, the rendering processes outlined may be carried out before an actual measurement, which enables a corresponding computational use and a high accuracy of the calculations. Furthermore, as already outlined initially, it is possible to use even a small real image for supporting the rendering and/or for fitting into the real image stack and ascertaining the deviation, said image being smaller than the ultimately rendered image or virtual field of view.

Figure 7:
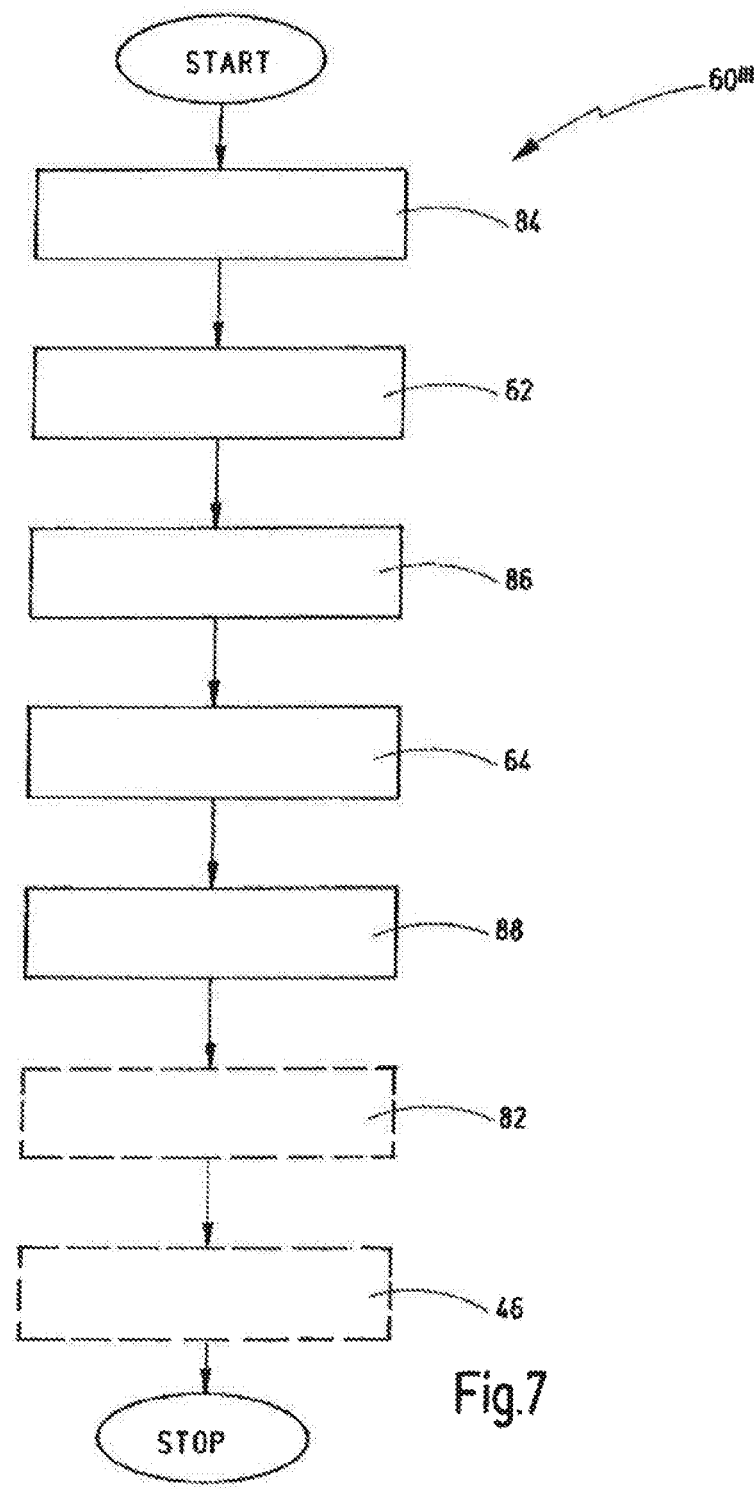
FIG. 7 shows a fourth embodiment of a method for simulating an image recording of a measurement object onto an optical sensor of a coordinate measuring machine.

However, FIG. 7 also shows a fourth embodiment of the method 60.

Firstly, in a step 84 by means of a measurement, for example by means of a wavefront aberrometer, the aberration of the lens or of the optics of the coordinate measuring machine is determined and stored for example in the form of a Zernike polynomial.

The step of providing 62 can thus be effected as described above. Afterward, at least one real image may be recorded in a step 86, in order to support step 64 of rendering. A step of rendering is to be carried out for example using the at least one real image as a starting value and a phase retrieval.

Subsequently, in a step 88, the at least one real image is then fitted into the image stack rendered step 64 and the aberrations are subtracted from the corresponding virtual images. Deviations remaining between the real image and the corresponding virtual image may likewise be ascertained and then taken into account when determining the image having a best image recording setting or an arbitrary different image in the measurement plane within the image stack in step 82.

In this way it becomes possible, for example, in a step 86, to fit a real image into the virtual image stack and to determine its image recording parameters. With knowledge of the aberration of the lens, this real image may then be freed of the aberration influences and the residual deviations that remained between this real image and the virtual image may be ascertained. On the basis thereof, it is then possible, for example, in the best image recording setting, for a simulated image once again to be subjected to the deviations in optics aberrations in order to generate an image as real as possible in this plane. It goes without saying that it is also possible to free this image of the known aberrations in the image recording with the best image recording setting, for example the best focal plane, and to output it for an assumed ideal optics or an ideal lens. This may also yield an improved depth of focus upstream and/or downstream of the plane of the best image recording, for example the best focal plane.

Ultimately it is also conceivable to provide the newly calculated images with virtual optical elements in the beam path, instead of converting them to ideal optics. By way of example, opaque or partly transparent or diffusely scattering media may be arranged virtually in the beam path and the measurement object may be observed through them or through their boundary layers.

What is claimed is:

1. A method for operating a coordinate measuring machine having an optical sensor and/or an illumination device for inspecting a measurement object, comprising the following steps:
    providing a first data set representing a model of the measurement object, a second data set representing a model of an illumination of the measurement object, and a third data set representing a model of an optics of the optical sensor, and
    rendering an image stack on the basis of the first data set, the second data set and the third data set, wherein the image stack comprises a plurality of virtual images of at least a partial region of the measurement object, wherein each virtual image is rendered at least with a different second and/or different third data set;
    wherein, before the step of rendering, at least one real image of the measurement object is recorded by the optical sensor and is used as a support point for the step of rendering, wherein the region of the measurement object in which the plurality of virtual images are rendered is lamer than a region of the measurement object from which the real image is recorded; and
    the further step of adjusting the settings of the optics and/or the illumination device of the coordinate measuring machine in accordance with the settings in the virtual image identified as having the best quality.

2. The method as claimed in claim 1, further comprising the following steps:
    determining a parameter representing a quality of the image recording in each virtual image of the image stack,
    ascertaining the virtual image for which the parameter representing the quality of the image recording takes an optimum, and
    defining the second and/or third data set underlying the image recording of said virtual image as the best image recording setting.

3. The method as claimed in claim 2, wherein an image recording setting of the optics and/or of the illumination device of the coordinate measuring machine is effected proceeding from an image recording setting of the real image with respect to the best image recording setting.

4. The method as claimed in claim 3, wherein the image recording setting of each real image is previously known.

5. A method for operating a coordinate measuring machine having an optical sensor and/or an illumination device for inspecting a measurement object, comprising the following steps:
    providing a first data set representing a model of the measurement object, a second data set representing a model of an illumination of the measurement object, and a third data set representing a model of an optics of the optical sensor, and
    rendering an image stack on the basis of the first data set, the second data set and the third data set, wherein the image stack has a plurality of virtual images of at least a partial region of the measurement object, wherein each virtual image is rendered at least with a different second and/or different third data set,
    the method further comprising the following steps:
    determining a parameter representing a quality of the image recording in each virtual image of the image stack,
    ascertaining the virtual image for which the parameter representing the quality of the image recording takes an optimum,
    defining the second and/or third data set underlying the image recording of said virtual image as the best image recording setting, and
    applying the best image recording setting at least to the optics and/or to the illumination device of the coordinate measuring machine,
    wherein a real image of the measurement object is recorded by the optical sensor, and an image recording setting of the optics and/or of the illumination of the coordinate measuring machine is effected proceeding from an image recording setting of the real image with respect to the best image recording setting, and
    wherein, after the step of rendering, each real image is fitted into the image stack by correlation with the virtual images of the image stack and the image recording setting of the real image is thereby ascertained.

6. A method for operating a coordinate measuring machine having an optical sensor and/or an illumination device for inspecting a measurement object, comprising the following steps:
    providing a first data set representing a model of the measurement object, a second data set representing a model of an illumination of the measurement object, and a third data set representing a model of an optics of the optical sensor, and
    rendering an image stack on the basis of the first data set, the second data set and the third data set, wherein the image stack has a plurality of virtual images of at least a partial region of the measurement object, wherein each virtual image is rendered at least with a different second and/or different third data set, wherein a real image of the measurement object is recorded by the optical sensor, wherein after the step of rendering, the real image is fitted into the image stack by correlation with the virtual images of the image stack, and wherein deviations between the real image and a corresponding virtual image of the image stack are ascertained.

7. The method as claimed in claim 6, wherein a best virtual image with the best image recording setting is rendered taking account of the deviations.

8. The method as claimed in claim 6, wherein a virtual image in a measurement plane which is a plane with an arbitrary image recording setting within the image stack is rendered taking account of the deviations.

9. The method as claimed in claim 6, wherein the third data set has previously detected aberrations of the optics of the optical sensor and the aberrations are subtracted during the rendering of the best virtual image or of the virtual image in a measurement plane.

10. The method as claimed in claim 9, wherein the previously detected aberrations of the optics of the optical sensor are stored in the form of a Zernike polynomial.

11. A method for optimizing an image recording of a measurement object in a coordinate measuring machine by an optical sensor, comprising the following steps:
provinding a first data set representing a model of the measurement object, a second data set representing a model of an illumination of the measurement object, and a third data set representing a model of an optics of the optical sensor,
simulating an image recording of at least one virtual image of the measurement object imaged onto the optical sensor by rendering on the basis of the first data set, the second data set and the third data set, and
setting the image recording of the measurement object on the basis of the at least one simulated virtual image of the measurement object,
wherein the step of simulating the image recording of the at least one virtual image of the measurement object imaged onto the optical sensor is a method for operating a coordinate measuring machine having an optical sensor and/or an illumination device for inspecting a measurement object, comprises the following steps:
providing a first data set representing a model of the measurement object, a second data set representing a model of an illumination of the measurement object, and a third data set representing a model of an optics of the optical sensor, and
rendering an image stack on the basis of the first data set, the second data set and the third data set, wherein the image stack has a plurality of virtual images of at least a partial region of the measurement object, wherein each virtual image is rendered at least with a different second and/or different third data set,
wherein a real image of the measurement object is recorded by the optical sensor, wherein after the step of rendering, the real image is fitted into the image stack by correlation with the virtual images of the image stack, and wherein deviations between the real image and a corresponding virtual image of the image stack are ascertained.

12. A method for operating a coordinate measuring machine having an optical sensor and/or an illumination device for inspecting a measurement object, comprising the following steps:
providing a first data set representing a model of the measurement object, a second data set representing a model of an illumination of the measurement object, and a third data set representing a model of an optics of the optical sensor,
simulating an image recording of at least one virtual image of the measurement object imaged onto the optical sensor by rendering on the basis of the first data set, the second data set and the third data set, and
setting the image recording of the measurement object on the basis of the at least one simulated virtual image of the measurement object,
ascertaining the quality of the image recording of the measurement object by determining a value of a parameter representing the quality from at least one of the at least one rendered virtual image,
comparing the value of the parameter with a limit value, and
either, if the comparison is negative, varying at least the second data set and/or the third data set, and repeating the steps of simulating, ascertaining and comparing,
or, if the comparison is positive, using the second data set for setting the image recording by the coordinate measuring machine.

13. A method for operating a coordinate measuring machine having an optical sensor and/or an illumination device for inspecting a measurement object, comprising the following steps:
providing a first data set representing a model of the measurement object, a second data set representing a model of an illumination of the measurement object, and a third data set representing a model of an optics of the optical sensor,
simulating an image recording of at least one virtual image of the measurement object imaged onto the optical sensor by rendering on the basis of the first data set, the second data set and the third data set, and
setting the image recording of the measurement object on the basis of the at least one simulated virtual image of the measurement object,
ascertaining the quality of the image recording of the measurement object by determining a value of a parameter representing the quality from at least one of the at least one rendered virtual image,
varying at least the second data set and/or the third data set within a predetermined optimization range and repeating the steps of simulating and ascertaining,
using that second data set for setting the image recording by the coordinate measuring machine for which the parameter representing the quality takes an optimum.

14. A coordinate measuring machine for inspecting a measurement object, comprising an optical sensor and comprising a data processing device for controlling the coordinate measuring machine, wherein the data processing device is configured in such a way that it performs a method for simulating an image recording by an optical sensor of a coordinate measuring machine for inspecting a measurement object, wherein the method for simulating comprises the following steps:
providing a first data set representing a model of the measurement object, a second data set representing a model of an illumination of the measurement object, and a third data set representing a model of an optics of the optical sensor, and
rendering an image stack on the basis of the first data set, the second data set and the third data set, wherein the image stack has a plurality of virtual images of at least a partial region of the measurement object, wherein each virtual image is rendered at least with a different second and/or different third data set
wherein a real image of the measurement object is recorded by the optical sensor, wherein after the step of rendering, the real image is fitted into the image stack by correlation with the virtual images of the image stack, and wherein deviations between the real image and a corresponding virtual image of the image stack are ascertained.

15. A non-transitory computer-readable storage medium containing a computer program comprising program code which, when executed on a data processing device, carries out a process for operating a coordinate measuring machine having an optical sensor and/or an illumination device for inspecting a measurement object, wherein the method for simulating comprises the following steps:

providing a first data set representing a model of the measurement object, a second data set representing a model of an illumination of the measurement object, and a third data set representing a model of an optics of the optical sensor, and rendering an image stack on the basis of the first data set, the second data set and the third data set, wherein the image stack has a plurality of virtual images of at least a partial region of the measurement object, wherein each virtual image is rendered at least with a different second and/or different third data set, wherein a real image of the measurement object is recorded by the optical sensor, wherein after the step of rendering, the real image is fitted into the image stack by correlation with the virtual images of the image stack, and wherein deviations between the real image and a corresponding virtual image of the image stack are ascertained.

16. The computer-readable storage medium as claimed in claim 15, wherein the data processing device is a data processing device of a coordinate measuring machine.

* * * * *

UNITED STATES PATENT AND TRADEMARK OFFICE
CERTIFICATE OF CORRECTION

Page 1 of 1

PATENT NO.         : 9,990,724 B2
APPLICATION NO.    : 15/196614
DATED              : June 5, 2018
INVENTOR(S)        : Thomas Engel et al.

It is certified that error appears in the above-identified patent and that said Letters Patent is hereby corrected as shown below:

On the Title Page

Item (*) Notice Column 1
Line 3                          delete "days. days" and insert --days.--

In the Claims

Column 13
Claim 1, Line 57                delete "lamer" and insert --larger--

Signed and Sealed this
Eleventh Day of September, 2018

Andrei Iancu
*Director of the United States Patent and Trademark Office*